United States Patent
Rajput et al.

(10) Patent No.: US 12,355,818 B2
(45) Date of Patent: Jul. 8, 2025

(54) METHODS, SYSTEMS, AND COMPUTER READABLE MEDIA FOR IMPROVING INTER-PUBLIC LAND MOBILE NETWORK (PLMN) ROUTING ACROSS SECURITY EDGE PROTECTION PROXIES (SEPPs) BY IMPLEMENTING HEALTH CHECKS FOR REMOTE SEPPs

(71) Applicant: Oracle International Corporation, Redwood Shores, CA (US)

(72) Inventors: Jay Rajput, Bangalore (IN); Virendra Singh, Bangalore (IN); John Nirmal Mohan Raj, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 255 days.

(21) Appl. No.: 18/099,202

(22) Filed: Jan. 19, 2023

(65) Prior Publication Data

US 2024/0250989 A1 Jul. 25, 2024

(51) Int. Cl.
G06F 21/00 (2013.01)
H04L 9/40 (2022.01)
H04W 84/04 (2009.01)

(52) U.S. Cl.
CPC .......... H04L 63/20 (2013.01); H04L 63/0281 (2013.01); H04W 84/042 (2013.01)

(58) Field of Classification Search
CPC ... H04L 63/20; H04L 63/0281; H04W 84/042
See application file for complete search history.

(56) References Cited

U.S. PATENT DOCUMENTS

| 7,929,419 | B2 | 4/2011 | Sprague |
| 11,533,358 | B1* | 12/2022 | Khare ............ H04L 69/22 |
| 2020/0036754 | A1* | 1/2020 | Livanos ........ H04W 48/16 |

(Continued)

OTHER PUBLICATIONS

"3rd Generation Partnership Project; Technical Specification Group Services and System Aspects; Security architecture and procedures for 5G system (Release 18)", 3GPP TS 33.501, V18.4.0, pp. 1-326 (Dec. 2023).

(Continued)

*Primary Examiner* — Michael M Lee
(74) *Attorney, Agent, or Firm* — Jenkins, Taylor & Hunt, P.A.

(57) ABSTRACT

A method for improving inter-PLMN routing by implementing health checks for remote SEPPs includes storing a target SEPP database including records corresponding to remote SEPPs to which SBI request messages can be routed. The method further includes receiving SBI request messages destined for NFs in PLMNs protected by the remote SEPPs, using the target SEPP database to select and route messages to the remote SEPPs. The method further includes, for each of the remote SEPPs, sending a health check message to the remote SEPP, determining, based on a response or lack of a response to the health check message that the remote SEPP is unhealthy or unreachable, and, in response, removing a record for the remote SEPP from the target SEPP database or marking the record for the remote SEPP to indicate that the remote SEPP is unhealthy or unreachable.

16 Claims, 8 Drawing Sheets

(56) References Cited

U.S. PATENT DOCUMENTS

| | | | | |
|---|---|---|---|---|
| 2020/0314615 | A1* | 10/2020 | Patil | H04W 48/18 |
| 2022/0030413 | A1* | 1/2022 | Ben Henda | H04W 12/06 |
| 2023/0099468 | A1* | 3/2023 | Khare | H04W 8/18 |
| | | | | 455/432.1 |
| 2023/0269579 | A1* | 8/2023 | Ma | H04L 63/0428 |
| | | | | 455/411 |

OTHER PUBLICATIONS

"3rd Generation Partnership Project; Technical Specification Group Core Network and Terminals; 5G System; Network Function Repository Services; Stage 3 (Release 18)", 3GPP TS 29.510, V18.5.0, pp. 1-382 (Dec. 2023).

"3rd Generation Partnership Project; Technical Specification Group Core Network and Terminals; 5G System; Public Land Mobile Network (PLMN) Interconnection; Stage 3 (Release 18)", 3GPP TS 29.573, V18.5.0, pp. 1-130 (Dec. 2023).

Postel, J. "DARPA Internet Program Protocol Specification", Internet Engineering Task Force (IETF) Request for Comments (RFC) 792, pp. 1-21 (Sep. 1981).

Fielding, et al., "Hypertext Transfer Protocol (HTTP/1.1): Semantics and Content", Internet Engineering Task Force (IETF) Request for Comments (RFC) 7231, pp. 1-101 (Jun. 2014).

Commonly-Assigned, co-pending U.S. Appl. No. 18/618,742 for "Methods, Systems, and Computer Readable Media for Forwarding Inter-Public Land Mobile Network (PLMN) Service-Based Interface (SBI) Request Messages to Available Producer Security Edge Protection Proxies (P-SEPPs)" (Unpublished, filed Mar. 27, 2024).

"3rd Generation Partnership Project; Technical Specification Group Core Network and Terminals; 5G System; Public Land Mobile Network (PLMN) Interconnection; Stage 3 (Release 18)", 3GPP TS 29.573, V18.1.0, pp. 1-116 (Dec. 2022).

"3rd Generation Partnership Project; Technical Specification Group Core Network and Terminals; 5G System; Network Function Repository Services; Stage 3 (Release 18)", 3GPP TS 29.510, V18.1.0, pp. 1-357 (Dec. 2022).

"3rd Generation Partnership Project; Technical Specification Group Services and System Aspects; Procedures for the 5G System (5GS); Stage 2 (Release 17)", 3GPP TS 23.502, V17.7.0, pp. 1-748 (Dec. 2022).

"3rd Generation Partnership Project; Technical Specification Group Services and System Aspects; System Architecture for the 5G System (5GS); Stage 2 (Release 17)", 3GPP TS 23.501, V17.7.0, pp. 1-573 (Dec. 2022).

\* cited by examiner

METHODS, SYSTEMS, AND COMPUTER READABLE MEDIA FOR IMPROVING INTER-PUBLIC LAND MOBILE NETWORK (PLMN) ROUTING ACROSS SECURITY EDGE PROTECTION PROXIES (SEPPs) BY IMPLEMENTING HEALTH CHECKS FOR REMOTE SEPPs

TECHNICAL FIELD

The subject matter described herein relates to routing messages between PLMNs. More particularly, the subject matter described herein relates to improving inter-PLMN routing across SEPPs by implementing health checks for remote SEPPs.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides a service. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the type of service provided by an NF instance as well as contact and capacity information regarding the NF instance.

A service communication proxy (SCP) can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances.

In addition to the SCP, another example of an intermediate proxy that forwards traffic between producer and consumer NFs is the security edge protection proxy (SEPP). The SEPP is the network function used to protect control plane traffic that is exchanged between different 5G public land mobile networks (PLMNs). As such, the SEPP performs message filtering, policing and topology hiding for all application programming interface (API) messages that are transmitted between PLMNs.

One problem in 5G and other types of networks is that there is no 3GPP-defined mechanism to proactively determine the health or reachability status of a remote SEPP. As used herein, the term "remote SEPP" refers to an SEPP protecting a PLMN that is different from the PLMN protected by a sending SEPP. While the availability status of a remote SEPP can be inferred from receipt of the NF profile of the remote SEPP from an NRF via the NFDiscover service operation, relying on the availability of the NF profile via the NFDiscover service operation as an indicator of the status of a remote SEPP may result in inaccurate availability determinations. For example, a remote SEPP may register with its local NRF, the remote SEPP may heart-beat correctly with its local NRF over the local PLMN, but the remote SEPP may be unreachable from an external PLMN. In another example, a remote SEPP may register with its local NRF, an SEPP may discover the NF profile of the remote SEPP from the NRF, and the remote SEPP may become unavailable after the SEPP discovers the NF profile of the remote SEPP. When a consumer NF seeks to contact a producer NF in a remote network, and the local SEPP is required to try multiple remote SEPPs to find a healthy SEPP to access the remote network, communication inefficiency occurs.

In light of these and other difficulties, there exists a need for improving communications between PLMNs by providing a mechanism for proactively determining the health or reachability status of remote SEPPs and using the health or reachability status in making routing decisions.

SUMMARY

A method for improving inter-public land mobile network (PLMN) routing by implementing health checks for remote security edge protection proxies (SEPPs) includes storing, at an SEPP, a target SEPP database including records corresponding to remote SEPPs to which service based interface (SBI) request messages can be routed. The method further includes receiving, by the SEPP, SBI request messages destined for network functions (NFs) in PLMNs protected by the remote SEPPs. The method further includes using, by the SEPP, the target SEPP database to select remote SEPPs to which the SBI request messages should be routed. The method further includes routing, by the SEPP, the SBI request messages to the SEPPs selected using the target SEPP database. The method further includes, for each of the remote SEPPs corresponding to one of the records in the target SEPP database, sending, by the SEPP, a health check message to the remote SEPP, determining, based on a response or lack of a response to the health check message that the remote SEPP is unhealthy or unreachable, and, in response, removing the record for the remote SEPP from the target SEPP database or marking the record for the remote SEPP to indicate that the remote SEPP is unhealthy or unreachable.

According to another aspect of the subject matter described herein, the target SEPP database includes maintaining, for each record in the target SEPP database, a priority and a capacity of the corresponding remote SEPP.

According to another aspect of the subject matter described herein, using the target SEPP database to select the remote SEPPs includes, for each SBI request message, selecting an SEPP identifier corresponding to an SEPP having a lowest priority and an available capacity among SEPP identifiers in the target SEPP database.

According to another aspect of the subject matter described herein, sending a health check message to the remote SEPP includes sending a security capability negotiation message to the remote SEPP.

According to another aspect of the subject matter described herein, sending a security capability negotiation message includes sending an N32-C security capability negotiation message to the remote SEPP.

According to another aspect of the subject matter described herein, sending the N32-C security capability negotiation message includes sending a hypertext transfer protocol (HTTP) POST message with an information element indicating a purpose of the HTTP POST message is health check. According to another aspect of the subject matter described herein, the method further includes, at the SEPP, periodically transmitting the health check messages to the remote SEPPs.

According to another aspect of the subject matter described herein, transmitting the health check messages to the remote SEPPs includes transmitting a health check message to one of the remote SEPPs in response to failing to receive traffic from the remote SEPP for a configured duration.

According to another aspect of the subject matter described herein, transmitting the health check messages to the remote SEPPs includes transmitting a health check message to one of the remote SEPPs in response to receiving erroneous traffic from the remote SEPP for a configured duration According to another aspect of the subject matter described herein, the method further includes refraining from routing the SBI request messages to the remote SEPP whose record has been removed or marked to indicate an unhealthy or unreachable SEPP status.

According to another aspect of the subject matter described herein, a system for improving inter-public land mobile network (PLMN) routing by implementing health checks for remote security edge protection proxies (SEPPs) is provided. The system includes an SEPP including at least one processor and a memory. The system further includes a target SEPP database stored in the memory and including records corresponding to remote SEPPs to which service based interface (SBI) request messages can be routed. The system further includes an inter-PLMN message router for receiving SBI request messages destined for network functions (NFs) in PLMNs protected by the remote SEPPs, using, by the SEPP, the target SEPP database to select remote SEPPs to which the SBI request messages should be routed; and routing, by the SEPP the SBI request messages to the SEPPs selected using the target SEPP database. The system further includes a remote SEPP health checker configured to, for each of the remote SEPPs corresponding to one of the records in the target SEPP database, send a health check message to the remote SEPP, determine, based on a response or lack of a response to the health check message that the remote SEPP is unhealthy or unreachable, and remove a record for the remote SEPP from the target SEPP database or mark the record for the remote SEPP in the target SEPP database to indicate that the remote SEPP is unhealthy or unreachable.

According to another aspect of the subject matter described herein, the target SEPP database includes maintaining, for each record in the target SEPP database, a priority and a capacity of the corresponding remote SEPP.

According to another aspect of the subject matter described herein, in selecting the remote SEPPs to which the SBI request messages should be routed, the inter-PLMN message router is configured to, for each SBI request message, select an SEPP identifier corresponding to an SEPP having a lowest priority and an available capacity among SEPP identifiers in the target SEPP database.

According to another aspect of the subject matter described herein, the health check message comprises a security capability negotiation message.

According to another aspect of the subject matter described herein, the security capability negotiation message comprises an N32-C security capability negotiation message.

According to another aspect of the subject matter described herein, the N32-C security capability negotiation message comprises a hypertext transfer protocol (HTTP) POST message with an information element indicating a purpose of the HTTP POST message is health check.

According to another aspect of the subject matter described herein, the remote SEPP health checker is configured to periodically transmit the health check messages to the remote SEPPs.

According to another aspect of the subject matter described herein, herein the remote SEPP health checker is configured to transmit a health check message to one of the remote SEPPs in response to failing to receive traffic from the remote SEPP for a configured duration.

According to another aspect of the subject matter described herein, the remote SEPP health checker is configured to transmit a health check message to one of the remote SEPPs in response to receiving erroneous traffic from the remote SEPP for a configured duration.

According to another aspect of the subject matter described herein, a non-transitory computer readable medium having stored thereon executable instructions that when executed by a processor of a computer control the computer to perform steps is provided. The steps include storing, at a security edge protection proxy (SEPP), a target SEPP database including records corresponding to remote SEPPs to which service based interface (SBI) request messages can be routed. The steps further include receiving, by the SEPP, SBI request messages destined for network functions (NFs) in PLMNs protected by the remote SEPPs. The steps further include using, by the SEPP, the target SEPP database to select remote SEPPs to which the SBI request messages should be routed. The steps further include routing, by the SEPP the SBI request messages to the SEPPs selected using the target SEPP database. The steps further include, for each of the remote SEPPs corresponding to one of the records in the target SEPP database, sending, by the SEPP, a health check message to the remote SEPP, determining, based on a response or lack of a response to the health check message that the remote SEPP is unhealthy or unreachable, and, in response, removing a record for the remote SEPP from the target SEPP database or marking the record for the remote SEPP to indicate that the remote SEPP is unhealthy or unreachable.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
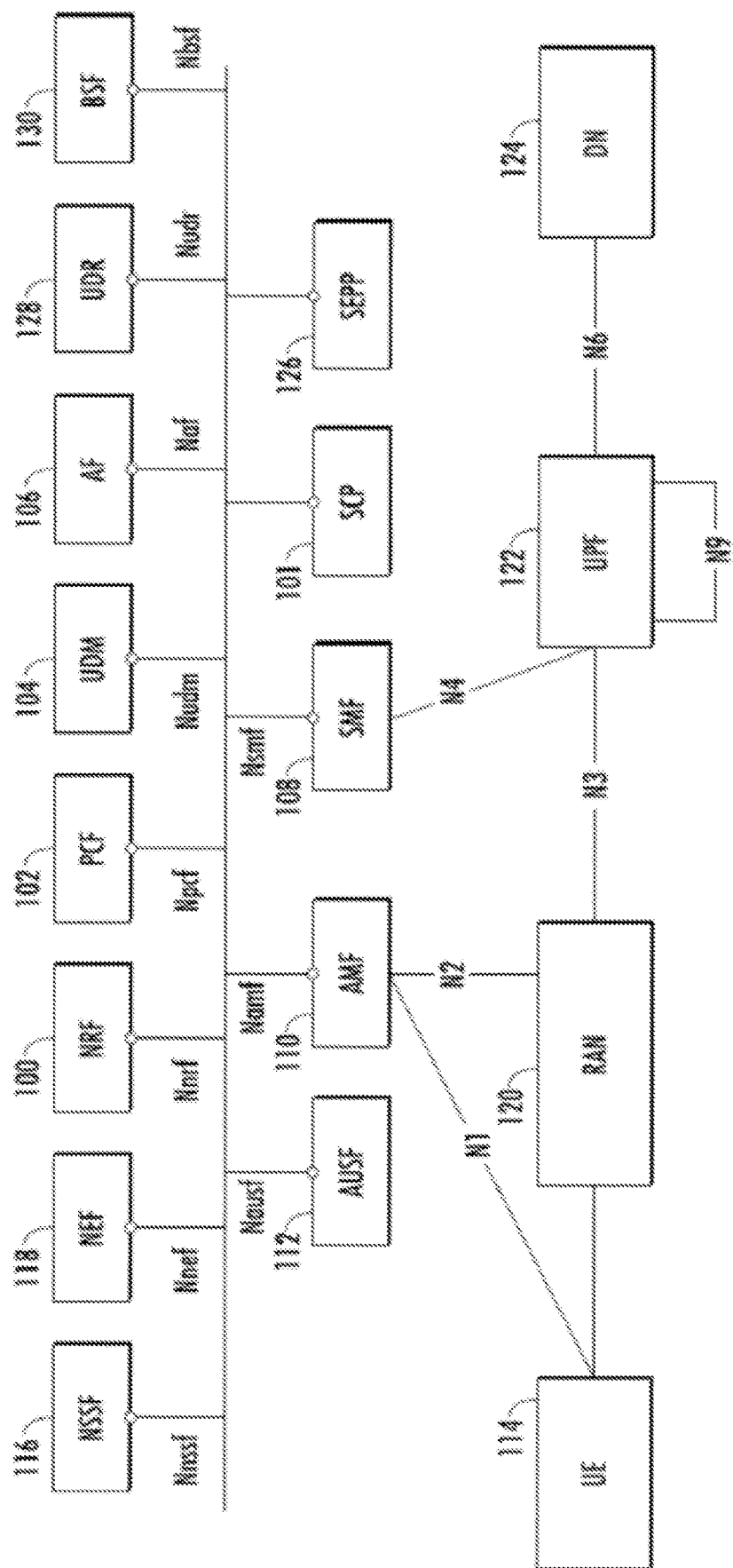
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. In order to communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between an access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. NSSF 116 provides the NSSelection service, which allows NFs to request information about network slices and the NSSAIReachability service, which enables NFs to update and subscribe to receive notification of updates in network slice selection assistance information (NSSAI) reachability information.

A network exposure function (NEF) 118 provides application programming interfaces (APIs) for application functions seeking to obtain information about Internet of things (IOT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a gNB (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN. A unified data repository (UDR) 128 stores subscription data for UEs. A binding support function (BSF) 130 manages bindings between PDU sessions and PCFs.

As stated above, one problem that can occur in 5G and other types of networks is that there is no 3GPP-defined mechanism to proactively determine the health or reachability status of a remote SEPP. In some network architectures, multiple SEPPs may cater to the same PLMN to provide high reachability inter-PLMN communications. Within the PLMN protected by the multiple SEPPs, the SEPPs may be properly heart-beating to the NRF. For example, when an SEPP registers with the NRF in a PLMN, the NRF communicates an NF heart-beat time interval to the SEPP, and the SEPP is required to send an NF heart-beat request message to the NRF each time the NF heart-beat time interval expires for the NRF to maintain a status of available for the SEPP. If the SEPP fails to send the NF heart-beat request message within the NF heart-beat time interval, the NRF marks the SEPP as unavailable and may not provide the NF profile of the SEPP to NFs (such as other SEPPs) seeking to discover the NF profile of the SEPP via the NFDiscover service operation. If the remote SEPP is heart-beating correctly with the NRF, the NRF will consider the SEPP to be available and will allow discovery of the NF profile of the SEPP.

Even if the SEPP is heart-beating properly to the NRF over the internal network, the SEPP may not be accessible from an external network. That is, an SEPP may be sending NF heart-beat request messages to the NRF over the PLMN in which the SEPP and the NRF both reside. However, the SEPP may be unreachable from outside of the PLMN. If the SEPP is heart-beating correctly, the NRF will consider the SEPP to be available and will allow discovery of the NF profile of the SEPP. Other SEPPs that receive the NF profile of the SEPP will consider the SEPP to be available and will either attempt and fail to contact the SEPP or will receive an error message from the SEPP, if the SEPP is reachable but unhealthy.

Figure 2:
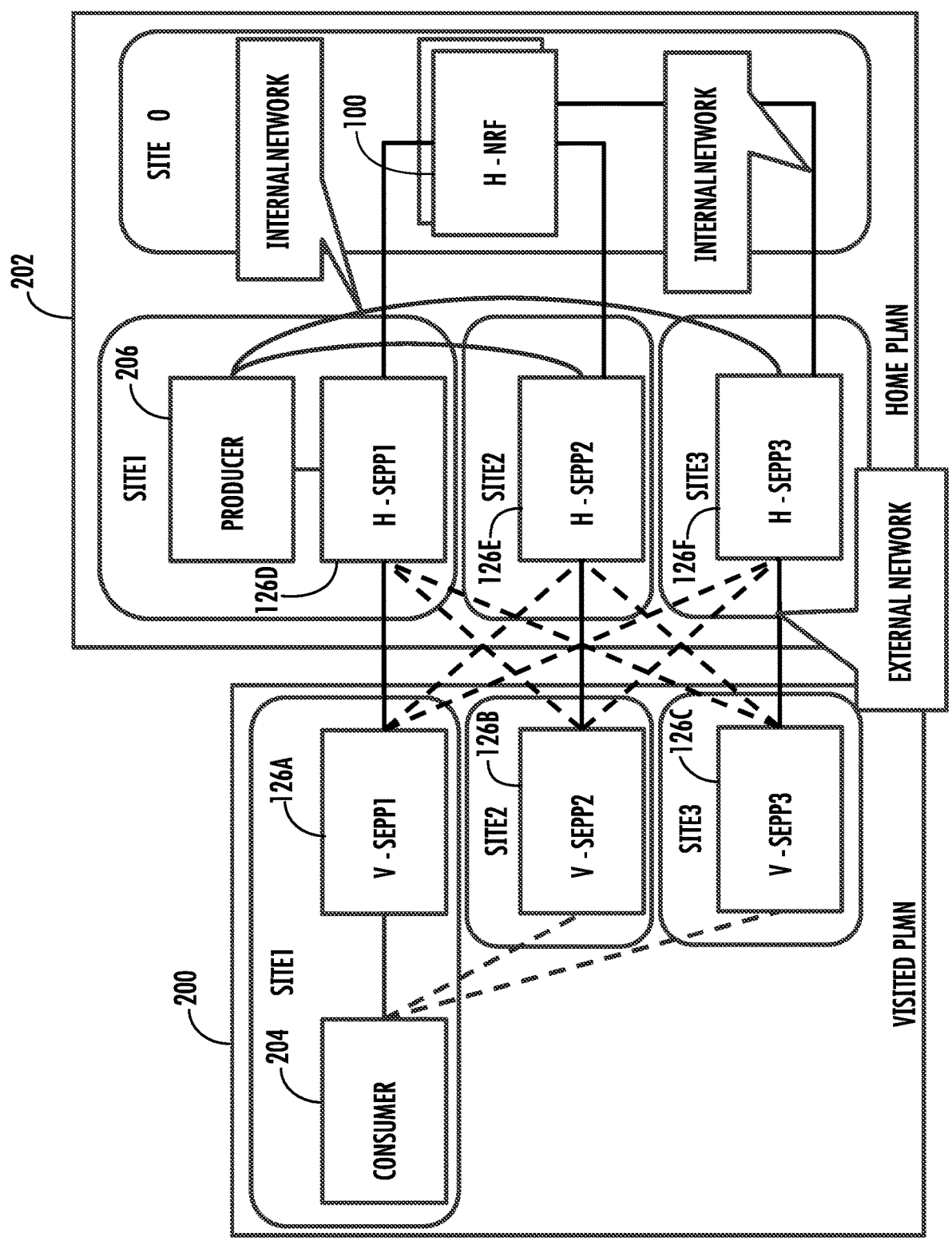
FIG. 2 is a network diagram illustrating networks served by multiple SEPPs.

FIG. 2 is a network diagram illustrating the case where multiple SEPPs serve each PLMN. Referring to FIG. 2, a visited PLMN 200 includes visited SEPPs (V-SEPPs) 126A, 126B, and 126C. A home PLMN 202 includes home SEPPs (H-SEPPs) 126D, 126E, and 126F. When a consumer NF 204 seeks to send a service based interface (SBI) request message to a producer NF 206 located in home PLMN 202, consumer NF 204 sends the message via one of V-SEPPs 126A, 126B, and 126C. The V-SEPP that receives the message selects among H-SEPPs 126D, 126E, and 126F to send a message to producer NF 206. If the V-SEPP that receives the message selects one of H-SEPPs 126D, 126E, and 126F that is unavailable, a message routing failure can occur, and the V-SEPP may be required to select an alternate H-SEPP for routing the message to producer NF 206. Such a routing failure can occur even though H-SEPPs 126D, 126E and 126F are heart-beating properly to H-NRF 100. When V-SEPP 126A discovers the NF profiles of SEPPs 126D, 126E, and 126F, V-SEPP 126A may assume that each of SEPPs 126D, 126E, and 126F is available and reachable, when one or more of SEPPs 126D, 126E, and 126F may be unreachable from networks outside of the home PLMN.

Figure 3:
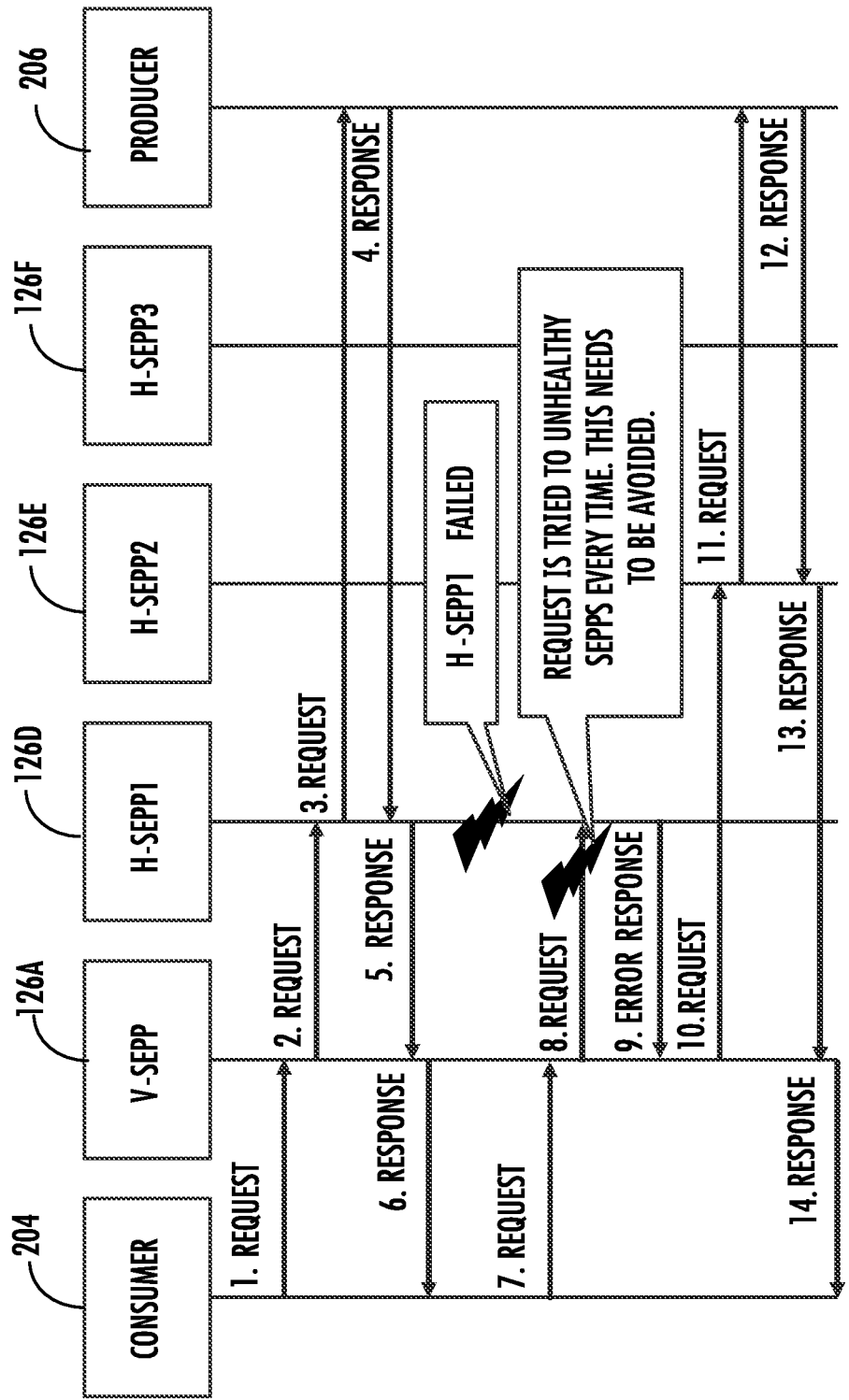
FIG. 3 is a message flow diagram illustrating messages exchanged between networks when a sending network attempts to contact an unhealthy or unreachable SEPP.

FIG. 3 is a message flow diagram illustrating exemplary messages that can occur because there is no defined mechanism to proactively check the health or reachability of a remote SEPP. In the absence of a proactive health check, unhealthy or unreachable SEPPs may be tried before healthy SEPPs, causing a delay in sending an SBI request message to a producer NF and a corresponding delay in the consumer NF receiving a response to the SBI request message from the producer NF. A consumer NF (e.g., the visited SEPP) can get the producer NF's (e.g., the home SEPP's) health status from an NRF local to the home SEPP. However, the health status may not take into account the connectivity between the visited SEPP and the home SEPP. A mechanism is needed to avoid sending request messages to unhealthy or unreachable SEPPs. A healthy and reachable SEPP should be prioritized over an unhealthy or unreachable SEPP even when configured with a lower priority (in 3GPP standards, a lower priority value means more preferred).

Referring to the message flow in FIG. 3, in line 1, consumer NF 204 sends an SBI request message intended for producer NF 206. V-SEPP 126A receives the SBI request message and selects one of H-SEPPs 126D, 126E and 126F to which the SBI request message should be forwarded based on priority and capacity information learned from an NRF (not shown in FIG. 3) in the home network using the NFDiscover service operation. Table 1 shown below illustrates priorities and capacities of remote SEPPs 126D, 126E, and 126F that V-SEPP 126A learns using the NFDiscover service operation.

TABLE 1

SEPP Priorities and Capacities

| SEPP | Priority | Capacity |
|---|---|---|
| H-SEPP1 126D | 1 | 100 |
| H-SEPP2 126E | 2 | 100 |
| H-SEPP3 126F | 3 | 100 |

From Table 1, it can be V-SEPP 126A determines that H-SEPP 126D is the lowest priority SEPP with available capacity. Accordingly, in line 2, V-SEPP 126A forwards the request to H-SEPP 126D. In line 3, H-SEPP 126D receives the request and forwards the request to producer NF 206.

In line 4, producer NF 206 sends a response message to consumer NF 204 via H-SEPP 126D. H-SEPP 126D receives the response and, in line 5, forwards the response to V-SEPP 126A. In line 6, V-SEPP 126A forwards the response to consumer NF 204.

After line 6, it is assumed that H-SEPP 126D fails or becomes unreachable. In line 7 of the message flow diagram, consumer NF 204 sends an SBI request message to producer NF 206. V-SEPP 126A receives the request and selects, using the priority and capacity information learned from the NRF, H-SEPP 126D as the SEPP to which the request should be forwarded. In line 8, V-SEPP 126A sends the request to H-SEPP 126D. However, H-SEPP 126D is unable to process the message and sends an error response in line 9. Alternatively, if H-SEPP 126D is unreachable, H-SEPP 126D may not receive the request message in line 8, and V-SEPP 126A may determine that a request message timeout has occurred.

In response to the error message in line 9 or a request message timeout, V-SEPP 126A selects, using the priority and capacity information in Table 1, H-SEPP 126E as the next lowest priority available SEPP to which the SBI request message can be forwarded. In line 10, V-SEPP 126A forwards the SBI request message to H-SEPP 126E. H-SEPP 126E receives the request message and, in line 11, forwards the request message to producer NF 206. In line 12, producer NF 206 generates a response and sends the response to consumer NF 204. H-SEPP 126E receives the response and, in line 13, forwards the response to V-SEPP 126A. V-SEPP 126A receives the response and, in line 14, sends the response to consumer NF 204.

To avoid unnecessarily routing messages to SEPPs that are unhealthy or unreachable, the subject matter described herein includes an SEPP that proactively performs health checks with remote SEPPs and uses the health or reachability status determined from the proactive health checking to make intelligent routing decisions. In one example, the checks may be performed by having the local SEPP message directly with remote SEPPs using messages that are normally used to perform a security capability negotiation procedure but that are modified to perform remote SEPP health checking. The SEPP performing the health checks may in one example maintain the health status of each SEPP in a target SEPP database local to the SEPP. In an alternate implementation, the SEPP performing the health checks may delete from its local target SEPP database entries corresponding to SEPPs that are unhealthy. The SEPP may periodically poll remote SEPPs using health check messaging and, when an SEPP becomes healthy or reachable, may add the SEPP to its target SEPP database.

Figure 4:
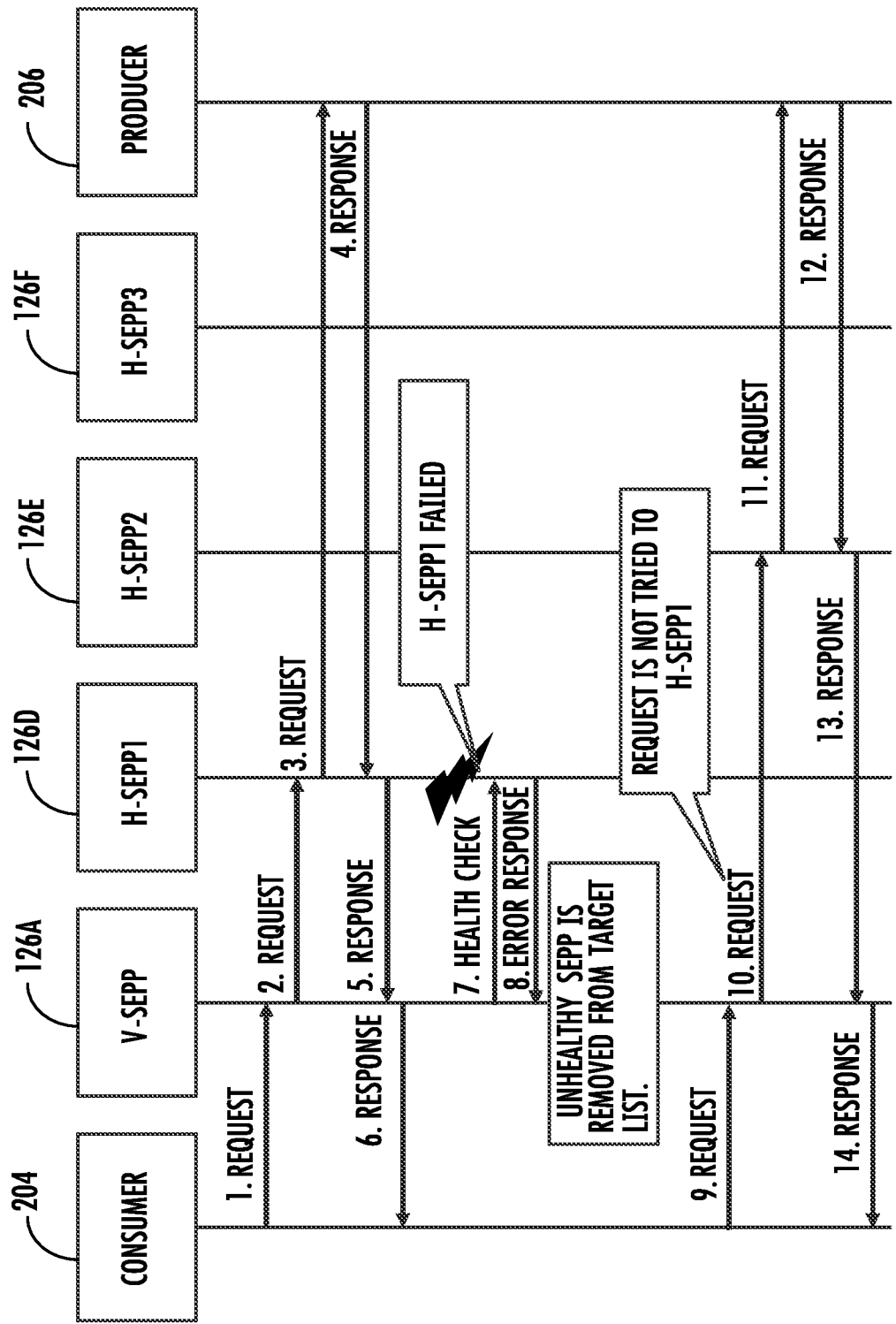
FIG. 4 is a message flow diagram illustrating an exemplary message exchange between networks where an SEPP proactively checks the health status of remote SEPPs and uses the health status to make intelligent routing decisions.

FIG. 4 is a message flow diagram illustrating exemplary messages exchanged in proactively determining the health or reachability status of a remote SEPP and using the health or reachability status to avoid sending messages to unhealthy or unreachable SEPPs. Referring to FIG. 4, in line 1, consumer NF 204 sends an SBI request to V-SEPP 126A. V-SEPP 126A receives the request and, in line 2, forwards the request to H-SEPP 126D. H-SEPP 126D receives the request and, in line 3, forwards the request to producer NF 206. In line 4, producer NF 206 generates a response and sends the response to consumer NF 204 via H-SEPP 126D. H-SEPP 126D receives the response and, in line 5, forwards the response to V-SEPP 126A. V-SEPP 126A receives the response and, in line 6, forwards the response to consumer NF 204.

After line 6, SEPP 126D fails or becomes unreachable. In line 7, V-SEPP 126A sends a health check message to H-SEPP 126D. The health check message may in one example, be a security capability negotiation message, such as an N32-C message normally used to negotiate security capabilities on the N32 interface between SEPPs. That is, V-SEPP 126A uses security capability negotiation messaging to perform health checking of remote SEPPs. The messaging used for health checking may be of the same HTTP message types as those used for N32-C security capability negotiation. However, the request message used as a health check request from a querying SEPP may include an additional or alternate information element that identifies the purpose of the message as health checking.

In line 8, H-SEPP 126D either responds to the health check message with an error response or, alternatively, does not response respond within a configured time period because SEPP 126D is unreachable. V-SEPP 126A, in response to receiving the error response or not receiving a response to the health check message within a configured timeout period, removes the record and/or identifier of the unhealthy SEPP from its target SEPP database. In an alternate implementation, V-SEPP 126A may mark a record for H-SEPP 126D in the target SEPP database to indicate that H-SEPP is unhealthy or unreachable. After removing the SEPP record for H-SEPP 126D from the target SEPP database or marking the record for H-SEPP 126D to indicate that H-SEPP 126D is unhealthy or unreachable, V-SEPP 126A refrains from selecting H-SEPP 126D to process SBI request messages. In this example, V-SEPP 126A selects, using the priority and capacity information learned from the NRF, SEPP 126E for processing the SBI request and, in line 10, forwards the SBI request to H-SEPP 126E. H-SEPP 126E receives the request and, in line 11, forwards the request to producer NF 206. Producer NF 206 receives the request and, in line 12, generates and sends a response message to consumer NF 204. H-SEPP 126E receives the response and, in line 13, forwards the response to V-SEPP 126A. V-SEPP 126A receives the response and, in line 14, forwards the response to consumer NF 204.

Figure 5:
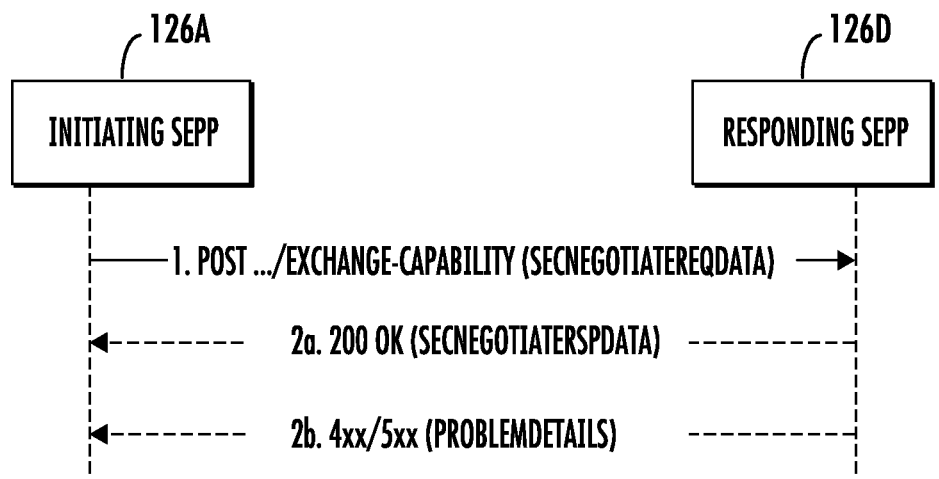
FIG. 5 is a message flow diagram illustrating exemplary messages exchanged in a security capability negotiation procedure that can be used to check the health or reachability status of a remote SEPP.

As stated above, in one example, the health check status checking may be implemented using messaging normally used for a security capability negotiation procedure. FIG. 5 illustrates exemplary messages that may be exchanged between an initiating SEPP, such as SEPP 126A, and the responding SEPP, such as SEPP 126D, in the security capability negotiation procedure. Referring to FIG. 5, in line 1, initiating SEPP 126A sends an HTTP POST message to responding SEPP 126D. The HTTP POST message may include a secure negotiate request data information element. The HTTP POST message may include an information element that indicates health checking as the purpose of the message. The information element that indicates health checking as the purpose of the message may be included in the HTTP POST message in addition to or instead of the secure negotiate request data information element. If responding SEPP 126D is reachable and healthy, responding SEPP 126D responds as indicated in line 2a with a 200 OK message. Receipt of the 200 OK message in response to the HTTP POST message with the health check information element may indicate to initiating SEPP 126A that responding SEPP 126D is healthy and reachable. If responding SEPP 126D is unhealthy, responding SEPP 126D may respond as indicated in line 2b with a 4xx or 5xx message indicating problem details. If responding SEPP 126D is unreachable, responding SEPP 126D may not respond within a configurable timeout period for the health check, and initiating SEPP 126A may determine, in response to expiration of the timeout period, that responding SEPP 126D is unreachable. In response to determining that responding SEPP 126D is unreachable, initiating SEPP 126A may remove the identifier of responding SEPP 126D from its target SEPP database or add an indicator to the record for responding SEPP 126D in the target SEPP database to indicate that responding SEPP 126D is unhealthy or unreachable.

The health check procedure may be implemented in response to triggering events and/or at periodic time intervals. Triggering events that may be used include the absence of traffic for a configured time period or detecting traffic failure, i.e., receiving erroneous traffic, for a configured time period. In one example, an SEPP may be configured with an interval that determines how frequently the SEPP checks the health/reachability status of remote SEPPs. The SEPP may be configured with timeout periods for each SEPP. Table 2 shown below illustrates examples of health check intervals and timeout periods that may be configured for remote SEPPs.

TABLE 2

Configured Intervals and Timeouts for Remote SEPPs

| SEPP ID | Interval | Timeout |
| --- | --- | --- |
| H-SEPP1 | 10 s | 2 s |
| H-SEPP2 | 10 s | 2 s |
| H-SEPP3 | 10 s | 2 s |

As can be seen in Table 2, for each SEPP identifier, the health checking SEPP is configured with the time interval that determines how often the SEPP checks the status of each remote SEPP. In addition, the health checking SEPP is also configured with the timeout that defines how long the health checking SEPP must wait before marking a remote SEPP as unhealthy or unreachable.

Figure 6:
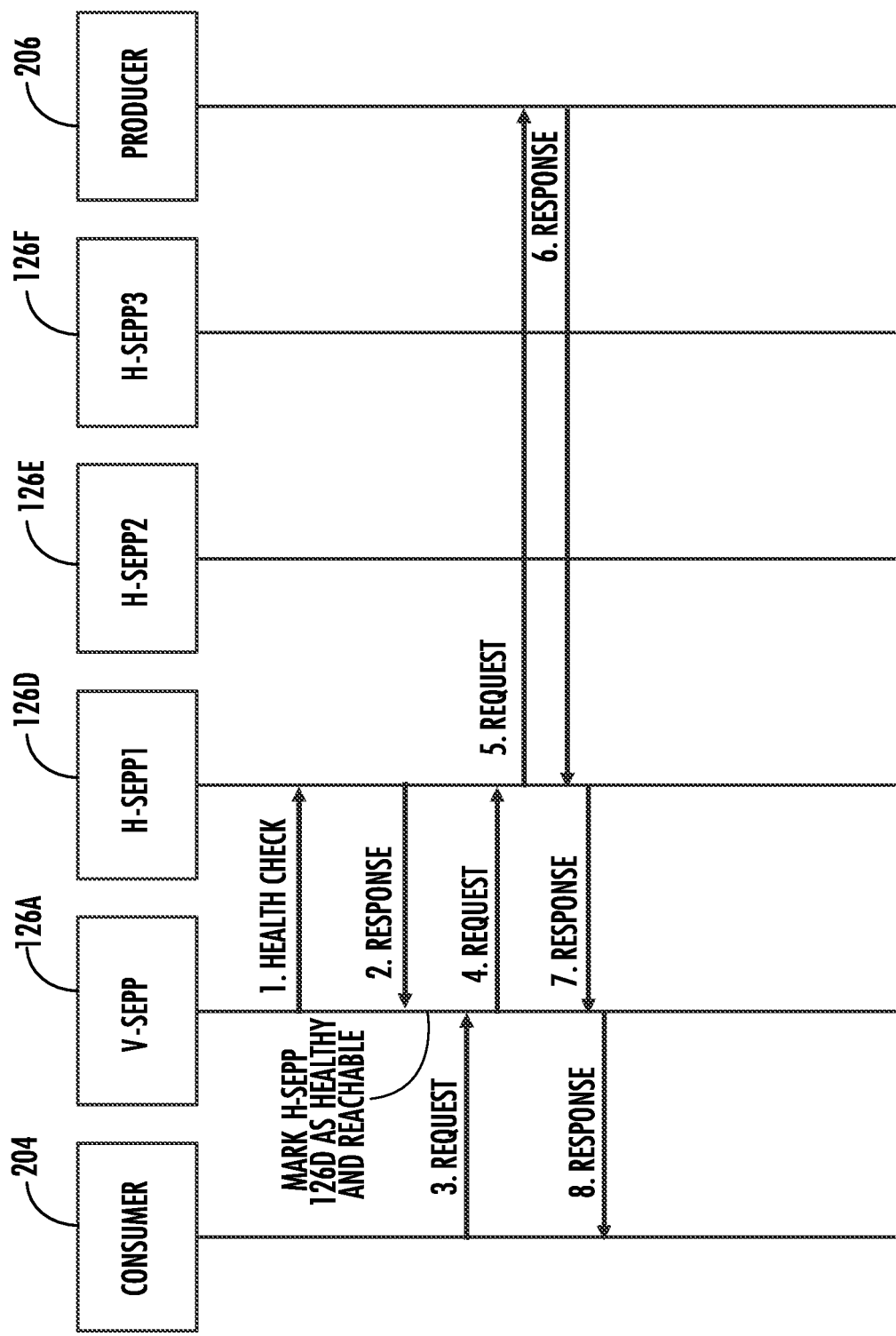
FIG. 6 is a message flow diagram illustrating exemplary messages exchanged between networks where an unhealthy or unreachable remote SEPP becomes healthy or reachable, an SEPP proactively checks and determines the change in status of the remote SEPP, and adds an identifier for the remote SEPP to its target SEPP database.

As indicated above, in one example, an SEPP may remove an SEPP identifier from its target SEPP database when the SEPP is determined to be unhealthy or unreachable and may add an SEPP identifier to its target SEPP database when the SEPP is determined to be healthy and reachable. FIG. 6 is a message flow diagram illustrating the adding of an SEPP identifier to the target SEPP database after the SEPP becomes healthy and reachable. Referring to FIG. 6, in line 1, SEPP 126A sends a health check message to remote SEPP 126D. In this example, it is assumed that remote SEPP 126D has previously been determined to be unhealthy by either failing to respond to a previous health check message or responding with an error. In line 2, remote SEPP 126D generates and sends a response to the health check message indicating that remote SEPP 126D is now healthy. SEPP 126A receives the response, determines that remote SEPP 126D is healthy and reachable, and either adds a record for remote SEPP 126D to its target SEPP database or removes the unhealthy or unreachable indicator from the record for remote SEPP 126D in the target SEPP database.

In line 3, consumer NF 204 sends an SBI request to producer NF 206. SEPP 126A receives the SBI request and selects, using priority and capacity information in the target SEPP database, remote SEPP 126D as the next hop for the SBI request message. In line 4, SEPP 126A sends the SBI request to SEPP 126D. SEPP 126D receives the request and, in line 5, forwards the request to producer NF 206. Producer NF 206 receives the request, generates a response and, in line 6, forwards the response to consumer NF 204. SEPP 126D receives the response and, in line 7, forwards the response to SEPP 126A. SEPP 126A receives the response and, in line 8, forwards the response to consumer NF 204.

Figure 7:
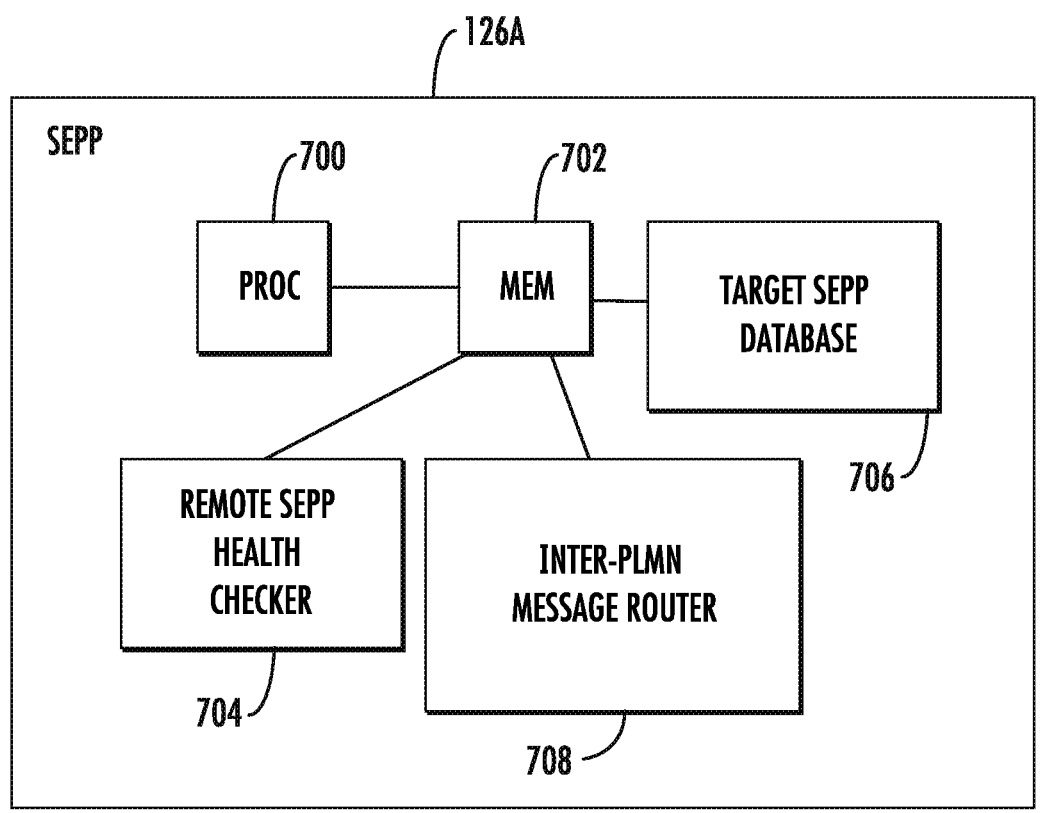
FIG. 7 is a block diagram illustrating an exemplary architecture for an SEPP that performs proactive remote SEPP health checking.

FIG. 7 is a block diagram illustrating an exemplary architecture for an SEPP that performs proactive remote SEPP health checking as described herein. Referring to FIG. 7, SEPP 126A includes at least one processor 700 and memory 702. SEPP 126A further includes a remote SEPP health checker 704 that checks and either stores a list of healthy and reachable remote SEPPs in a target SEPP database 706 or stores indicators of the health statuses of remote SEPPs in target SEPP database 706. Target SEPP database 706 may include a plurality of records, where each record corresponds to a remote SEPP. Each record may include an SEPP identifier, a priority, and a capacity, as indicated by Table 1 above. Each record may be indexed by a PLMN ID that identifies the PLMN protected by the SEPP. Thus, when a PLMN is protected by multiple SEPPs, multiple target SEPP database records may be indexed by the same PLMN ID, and SEPP 126A may select an SEPP for a particular SBI request using the priority and capacity information. Each record may further include a health or reachability status indicator. Alternatively, the records may not include a health or reachability status indicator, and the presence of a record for an SEPP in target SEPP database 706 may indicate that the SEPP is healthy and reachable.

Remote SEPP health checker 704 may be implemented using computer executable instructions stored in memory 702 and executed by processor 700. SEPP 126A may also include an inter-PLMN message router 708 that receives SBI request messages, reads destination PLMN information from the messages, uses the destination PLMN information to perform a lookup in target SEPP database 706, selects an SEPP among healthy and reachable SEPPs that protect the destination PLMN, and routes the messages to the selected target SEPP. Inter-PLMN message router 708 may refrain from selecting SEPPs that are indicated as unhealthy or unreachable, either by the absence of an identifier for an unhealthy or unreachable SEPP in target SEPP database 706 or by the presence of an indicator stored in target SEPP database 706 that an SEPP is unhealthy or unreachable. Inter-PLMN message router 708 may also be implemented using computer executable instructions stored in memory 702 and executed by processor 700.

Figure 8:
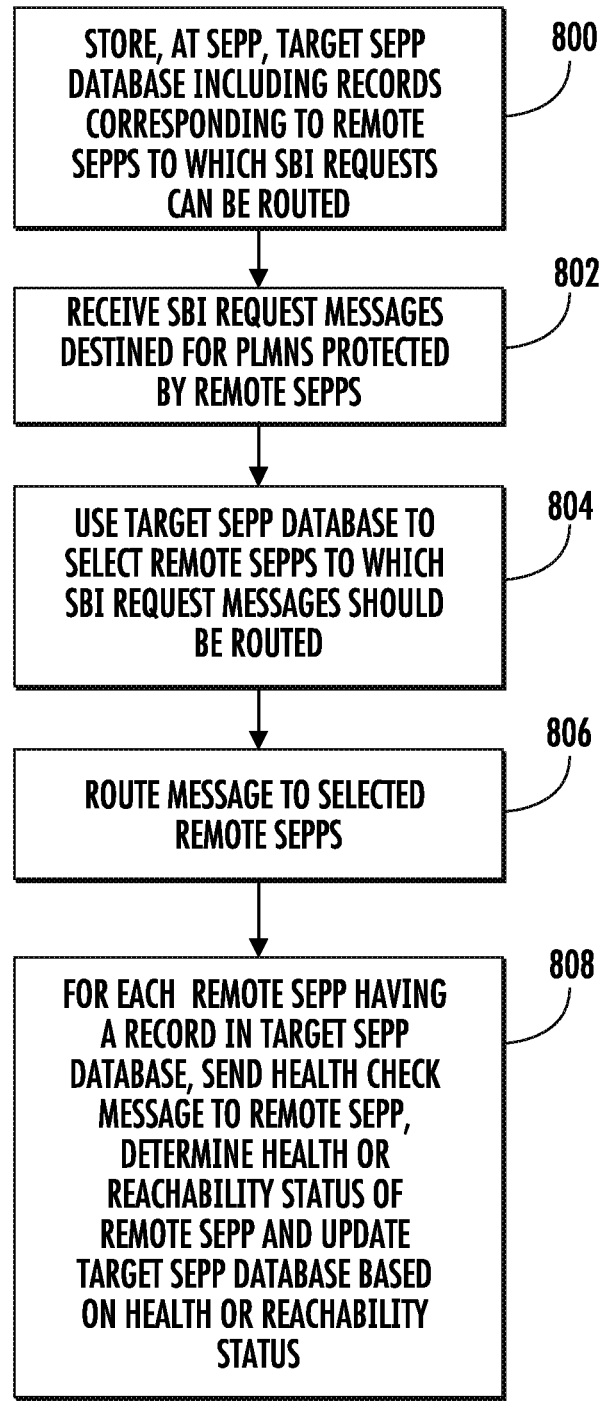
FIG. 8 is a message flow diagram illustrating an exemplary process performed by an SEPP for proactively checking the health or reachability status of remote SEPPs and using the health or reachability status to make intelligent routing decisions.

FIG. 8 is a flow chart illustrating an exemplary process for proactively determining health status of remote SEPPs and using the health status for intelligent message routing. Referring to FIG. 8, in step 800, the process includes storing, at an SEPP, a target SEPP database including records corresponding to remote SEPPs to which service based interface (SBI) request messages can be routed. For example, an SEPP, such as SEPP 126A, may be configured with a database of records, each including an identifier of a remote SEPP that protects a remote network. The records may be indexed by a PLMN ID of the PLMN protected by the remote SEPPs.

In step 802, the process includes receiving, by the SEPP, SBI request messages destined for network functions (NFs) in PLMNs protected by the remote SEPPs. For example, SEPP 126A may receive messages from consumer NFs or SCPs in the network protected by SEPP 126A and intended for a producer NF in the PLMN protected by SEPPs 126D, 126E, and 126F.

In step 804, the process includes using, by the SEPP, the target SEPP database to select remote SEPPs to which the SBI request messages should be routed. For example, SEPP 126A may extract PLMN identifiers from the SBI request messages and use the PLMN identifiers to locate records in target SEPP database 706 of SEPPs corresponding to SEPPs serving or protecting the remote PLMN. SEPP 126A may, in some cases determine that multiple SEPPs serve or protect the target PLMN. In such cases, SEPP 126A may select the SEPP having the lowest priority and an available capacity as the SEPP to which the SBI request should be forwarded.

In step 806, the process includes routing, by the SEPP, the SBI request messages to the SEPPs selected using the target SEPP database. For example, SEPP 126A may route or forward the SBI request over the N32-C interface to the SEPP selected in step 804.

In step 808, the process includes for each of the remote SEPPs corresponding to one of the records in the target SEPP database, sending, by the SEPP, a health check message to the remote SEPP, determining a health or reachability status of the remote SEPP, and updating the target SEPP database based on the health or reachability status. SEPP 126A may send the health check request messages to SEPPs whose identifiers are configured in the target SEPP database. The health check messages may be sent periodically or in response to events or conditions, such as lack of any traffic from an SEPP or receipt of erroneous traffic for a configured duration. If SEPP 126A receives an error response from a remote SEPP or fails to receive a response from a remote SEPP to a health check message within a configurable health check message timeout period, SEPP 126A may determine that the remote SEPP in unhealthy or unreachable. In response to determining that the remote SEPP is unhealthy or unreachable, SEPP 126A may either mark the record corresponding to the unhealthy or unreachable SEPP to indicate that the remote SEPP is unhealthy or unreachable or may delete the identifier and/or record corresponding to the unhealthy or unreachable SEPP from the target SEPP database. In one example, the health check messages used to monitor the health or reachability status or remote SEPPs are security capability negotiation messages, such as N32-C security capability negotiation messages. When used as health check messages, the N32-C security capability negotiation messages may be modified to identify the purpose of the messages as health check.

If a remote SEPP is determined to be unhealthy or unreachable, SEPP 126A may refrain from selecting the SEPP as a target SEPP for the remote PLMN. SEPP 126A may periodically check the health or reachability status of remote SEPPs that have been determined to be unhealthy or unreachable by sending health check messages to the remote SEPPs. If a remote SEPP responds to a health check message within the health check message timeout period, SEPP 126A may add the record for the remote SEPP to the target SEPP database and/or remote the unhealthy or unreachable status indicator from the record corresponding to the SEPP to indicate that the SEPP is healthy and reachable. In the case where SEPP 126A removes records for unhealthy or unreachable SEPPs from the target SEPP database, SEPP 126A may maintain a separate database or list of records of SEPPs whose records have been removed from the target SEPP database.

Exemplary advantages of the subject matter described herein include reduced latency for inter-PLMN messages as the healthy SEPPs are prioritized over unhealthy SEPPs. Another advantage is enhanced operational experience as a local operator is aware of the health status of remote SEPPS and can take proactive action. Yet another advantage is ease of implementation. For example, using modified N32-C security capability negotiation messages as health check messages requires minimal modification to SEPPs, as SEPPs are already configured to handle and process security capability negotiation messages sent on the N32-C interface. The disclosure of each of the following references is hereby incorporated herein by reference in its entirety.

REFERENCES 1. 3$^{rd}$ Generation Partnership Project; Technical Specification Group Services and System Aspects; System Architecture for the 5G System (5GS); Stage 2; (Release 17) 3GPP TS 23.501 V17.7.0 (2022-12)
2. 3$^{rd}$ Generation Partnership Project; Technical Specification Group Services and System Aspects; Procedures for the 5G System (5GS); Stage 2 (Release 17) 3GPP TS 23.502 V17.7.0 (2022-12)
3. 3$^{rd}$ Generation Partnership Project; Technical Specification Group Core Network and Terminals; 5G System; Network Function Repository Services; Stage 3 (Release 18) 3GPP TS 29.510 V18.1.0 (2022-12)
4. 3$^{rd}$ Generation Partnership Project; Technical Specification Group Core Network and Terminals; 5G System; Public Land Mobile Network (PLMN) Interconnection; Stage 3 (Release 18) 3GPP TS 29.573 V18.1.0 (2022-12)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for improving inter-public land mobile network (PLMN) routing by implementing health checks for remote security edge protection proxies (SEPPs), the method comprising:
   storing, at an SEPP, a target SEPP database including records corresponding to the remote SEPPs to which service based interface (SBI) request messages can be routed, wherein storing the target SEPP database includes storing, for each record in the target SEPP database, a priority and a capacity of a corresponding remote SEPP;
   receiving, by the SEPP, SBI request messages destined for network functions (NFs) in PLMNs protected by the remote SEPPs;
   using, by the SEPP, the target SEPP database to select remote SEPPs to which the SBI request messages should be routed, wherein using the target SEPP database to select the remote SEPPs includes, for each SBI request message, selecting an SEPP identifier corresponding to an SEPP having a lowest priority and an available capacity among SEPP identifiers in the target SEPP database;
   routing, by the SEPP, the SBI request messages to the remote SEPPs selected using the target SEPP database; and
   for each of the remote SEPPs corresponding to one of the records in the target SEPP database, sending, by the SEPP, a health check message to a remote SEPP, determining, based on a response or lack of a response from the remote SEPP to the health check message that the remote SEPP is unhealthy or unreachable, and, in response, removing a record for the remote SEPP from the target SEPP database or marking the record for the remote SEPP in the target SEPP database to indicate that the remote SEPP is unhealthy or unreachable.

2. The method of claim 1 wherein sending a health check message to each of the remote SEPPs includes sending a security capability negotiation message to each of the remote SEPPs.

3. The method of claim 2 wherein sending a security capability negotiation message includes sending an N32-C security capability negotiation message to each of the remote SEPPs.

4. The method of claim 3 wherein sending the N32-C security capability negotiation message includes sending a hypertext transfer protocol (HTTP) POST message with an information element indicating a purpose of the HTTP POST message is health check.

5. The method of claim 1 wherein sending the health check message to each of the remote SEPPs includes periodically sending the health check message to each of the remote SEPPs.

6. The method of claim 1 wherein sending the health check message to each of the remote SEPPs includes sending a health check message to a first SEPP of the remote SEPPs in response to failing to receive traffic from the first SEPP for a configured duration.

7. The method of claim 1 comprising refraining from routing the SBI request messages to the remote SEPP whose record has been removed or marked to indicate that the remote SEPP is unhealthy or unreachable.

8. A method for improving inter-public land mobile network (PLMN) routing by implementing health checks for remote security edge protection proxies (SEPPs), the method comprising:
   storing, at an SEPP, a target SEPP database including records corresponding to the remote SEPPs to which service based interface (SBI) request messages can be routed;
   receiving, by the SEPP, SBI request messages destined for network functions (NFs) in PLMNs protected by the remote SEPPs;
   using, by the SEPP, the target SEPP database to select remote SEPPs to which the SBI request messages should be routed;
   routing, by the SEPP, the SBI request messages to the remote SEPPs selected using the target SEPP database; and for each of the remote SEPPs corresponding to one of the records in the target SEPP database, sending, by the SEPP, a health check message to a remote SEPP, determining, based on a response or lack of a response from the remote SEPP to the health check message that the remote SEPP is unhealthy or unreachable, and, in response, removing a record for the remote SEPP from the target SEPP database or marking the record for the remote SEPP in the target SEPP database to indicate that the remote SEPP is unhealthy or unreachable, wherein sending a health check message to each of the remote SEPPs includes sending a health check message to a first SEPP of the remote SEPPs in response to receiving erroneous traffic from the first SEPP for a configured duration.

9. A system for improving inter-public land mobile network (PLMN) routing by implementing health checks for remote security edge protection proxies (SEPPs), the system comprising:
an SEPP including at least one processor and a memory;
a target SEPP database stored in the memory and including records corresponding to the remote SEPPs to which service based interface (SBI) request messages can be routed, wherein the target SEPP database includes, for each record in the target SEPP database, a priority and a capacity of a corresponding remote SEPP;
an inter-PLMN message router for receiving SBI request messages destined for network functions (NFs) in PLMNs protected by the remote SEPPs, using the target SEPP database to select remote SEPPs to which the SBI request messages should be routed, and routing the SBI request messages to the remote SEPPs selected using the target SEPP database, wherein, in selecting the remote SEPPs to which the SBI request messages should be routed, the inter-PLMN message router is configured to, for each SBI request message, select an SEPP identifier corresponding to an SEPP having a lowest priority and an available capacity among SEPP identifiers in the target SEPP database; and
a remote SEPP health checker configured to, for each of the remote SEPPs corresponding to one of the records in the target SEPP database, send a health check message to a remote SEPP, determine, based on a response or lack of a response from the remote SEPP to the health check message, that the remote SEPP is unhealthy or unreachable, and, in response, remove a record for the remote SEPP from the target SEPP database or mark the record for the remote SEPP in the target SEPP database to indicate that the remote SEPP is unhealthy or unreachable.

10. The system of claim 9 wherein the health check message comprises a security capability negotiation message.

11. The system of claim 10 wherein the security capability negotiation message comprises an N32-C security capability negotiation message.

12. The system of claim 11 wherein the N32-C security capability negotiation message comprises a hypertext transfer protocol (HTTP) POST message with an information element indicating a purpose of the HTTP POST message is health check.

13. The system of claim 9 wherein the remote SEPP health checker is configured to periodically transmit the health check message to each of the remote SEPPs.

14. The system of claim 9 wherein the remote SEPP health checker is configured to transmit a health check message to a first SEPP of the remote SEPPs in response to failing to receive traffic from the first SEPP for a configured duration.

15. A system for improving inter-public land mobile network (PLMN) routing by implementing health checks for remote security edge protection proxies (SEPPs), the system comprising:
an SEPP including at least one processor and a memory;
a target SEPP database stored in the memory and including records corresponding to the remote SEPPs to which service based interface (SBI) request messages can be routed;
an inter-PLMN message router for receiving SBI request messages destined for network functions (NFs) in PLMNs protected by the remote SEPPs, using the target SEPP database to select remote SEPPs to which the SBI request messages should be routed, and routing the SBI request messages to the remote SEPPs selected using the target SEPP database; and
a remote SEPP health checker configured to, for each of the remote SEPPs corresponding to one of the records in the target SEPP database, send a health check message to a remote SEPP, determine, based on a response or lack of a response from the remote SEPP to the health check message, that the remote SEPP is unhealthy or unreachable, and, in response, remove a record for the remote SEPP from the target SEPP database or mark the record for the remote SEPP in the target SEPP database to indicate that the remote SEPP is unhealthy or unreachable, wherein the remote SEPP health checker is configured to transmit a health check message to a first SEPP of the remote SEPPs in response to receiving erroneous traffic from first SEPP for a configured duration.

16. A non-transitory computer readable medium having stored thereon executable instructions that, when executed by a processor of a computer, control the computer to perform steps comprising:
storing, at a security edge protection proxy (SEPP), a target SEPP database including records corresponding to remote SEPPs to which service based interface (SBI) request messages can be routed, wherein storing the target SEPP database includes storing, for each record in the target SEPP database, a priority and a capacity of a corresponding remote SEPP;
receiving, by the SEPP, SBI request messages destined for network functions (NFs) in PLMNs protected by the remote SEPPs;
using, by the SEPP, the target SEPP database to select remote SEPPs to which the SBI request messages should be routed, wherein using the target SEPP database to select the remote SEPPs includes, for each SBI request message, selecting an SEPP identifier corresponding to an SEPP having a lowest priority and an available capacity among SEPP identifiers in the target SEPP database;
routing, by the SEPP, the SBI request messages to the remote SEPPs selected using the target SEPP database; and
for each of the remote SEPPs corresponding to one of the records in the target SEPP database, sending, by the SEPP, a health check message to a remote SEPP, determining, based on a response or lack of a response to the health check message from the remote SEPP that the remote SEPP is unhealthy or unreachable, and, in response, removing a record for the remote SEPP from the target SEPP database or marking the record for the remote SEPP in the target SEPP database to indicate that the remote SEPP is unhealthy or unreachable.

* * * * *